United States Patent

[11] 3,572,729

[72] Inventor Elmer Raleigh Hodil, Jr.
 New Haven, Conn.
[21] Appl. No. 731,512
[22] Filed May 23, 1968
[45] Patented Mar. 30, 1971
[73] Assignee Olin Corporation

[54] EXPANDING RING SEAL
 2 Claims, 4 Drawing Figs.
[52] U.S. Cl.................................................. 277/71,
 89/26, 277/144
[51] Int. Cl...................................................B65d 53/00,
 F16j 15/46
[50] Field of Search............................................ 277/64, 70,
 71, 77, 79, 58, 117—120, 144, 190, 191, 236, 206,
 123, 124; 89/26; 92/(Inquired), 165, 169, 247

[56] References Cited
UNITED STATES PATENTS
735,101 8/1903 Howson......................... 89/26
1,326,242 12/1919 White............................ 277/120
FOREIGN PATENTS
918,013 2/1963 Great Britain................ 277/64

Primary Examiner—Houston S. Bell, Jr.
Attorneys—Donald R. Motsko, H. Samuel Kieser, William W. Jones, Richard S. Strickler, Robert H. Bachman, Donald R. Motsko and Thomas P. O'Day ABSTRACT: A fluid obturating device comprising at least two expandable rings which flex outwardly and inwardly respectively when subjected to fluid pressure.

PATENTED MAR 30 1971 3,572,729

INVENTOR:
ELMER R. HODIL JR.

BY William W. Jones
ATTORNEY

EXPANDING RING SEAL

This invention relates to a device for sealing against fluid leakage, which device is actuated by exposure to high fluid pressures.

In certain areas, particularly in the firearms industry, a need is present to provide a seal against escape of high-pressure gases. Such seals are needed, for example, in gas-operated systems and in breech-sealing systems. The seals should be ineffective unless exposed to high-pressure gases, at which time they should become immediately operative to seal the high-pressure gases against escape. Ordinary fluid-sealing means, such as rubber O-rings, joint packings, and the like are undesirable because of the inclusion in these systems of sliding parts, such as a piston or a bolt, the sliding of which is continually resisted by a constant fluid seal of the type mentioned above. Thus, ideally, the system should include a fluid obturator which is effective when exposed to high fluid pressures, and which looses its sealing characteristic when fluid pressures are lowered, thereby permitting subsequent easy sliding movement to occur between certain other components in the system.

One specific environment in which such a seal has been found to be particularly useful is in conjunction with a reciprocating bolt in a firearm which fires caseless ammunition. In a conventional firearm which fires ammunition having a casing, the casing is expanded outwardly against the wall of the firing chamber when the round is fired. Thus the casing provides a rearward gas-sealing effect which prevents combustion gases from being blown back directly against the bolt and into the receiver. Due to the omission of a casing on a caseless cartridge, such a rearward seal is not provided by a caseless cartridge when the latter is fired. Such a seal is, however, necessary in a caseless firearm to prevent undesirable blowback of combustion gases into the receiver.

A preferred embodiment of this invention is directed toward a fluidtight seal and a caseless firearm having the fluidtight seal between the receiver and the firing chamber. The firearm includes a receiver or housing having a cylindrical bore in which a bolt assembly is reciprocally mounted. The forward end of the bolt is movable into a battery position adjacent a firing chamber. An annular space is provided between the outside surface of the bolt and the wall of the cylindrical bore in the receiver, and at least two fluid-sealing rings are disposed adjacent each other in the annular space. The firing chamber communicates with the annular space forward of the sealing rings so that high-pressure gases developed in the firing chamber will pass back into the annular space and act upon the sealing rings. The sealing rings are normally loosely seated in the annular space so as to present no impedance to the reciprocating movement of the bolt within the receiver. One of the sealing rings is formed with radially inwardly converging sidewalls, and the other sealing ring is formed with radially outwardly converging sidewalls. The rings are mounted so that one wall on each ring is in face-to-face contact with an opposed wall of the other ring. Both rings are split, that is to say are transversely interrupted by a gap so that the rings will be able to flex both radially outwardly and inwardly. High-pressure gases produced when a round is fired are directed against one of the rings to act upon a converging sidewall thereof. The high-pressure gases acting upon the sidewall of the ring cause the ring to flex outwardly or inwardly, as the case may be, into sealing engagement with either the bolt or the cylindrical bore wall of the receiver. The force of the gases is transmitted by the first ring to the second ring through the face-to-face sidewalls, causing the second ring to flex radially in the opposite direction from the first ring. Thus the rings seal the annular space against fluid leakage when a round is fired. After the high-pressure gases are dissipated through the barrel the rings flex back to their original configuration and the bolt is free to reciprocate in the receiver without hindrance from the rings.

It is, therefore, an object of this invention to provide a fluid-sealing device which is selectively actuated by exposure to high-pressure fluids.

It is a further object of this invention to provide a fluid-sealing device of the character described which is ineffective unless exposed to high-pressure fluids.

It is yet another object of this invention to provide a fluid-sealing device of the character described utilizing preferably at least two cooperating sealing rings which are radially flexed in opposite directions by exposure to high-pressure gases.

It is a still further object of this invention to provide a firearm for use with caseless ammunition which firearm includes a fluid seal of the character described.

It is still another object of this invention to provide a caseless firearm having a fluid seal to prevent high-pressure combustion gases from entering the receiver when a round is fired.

Other features, objects, and advantages of this invention will become apparent from the following detailed description and accompanying drawings, in which.

Figure 1:
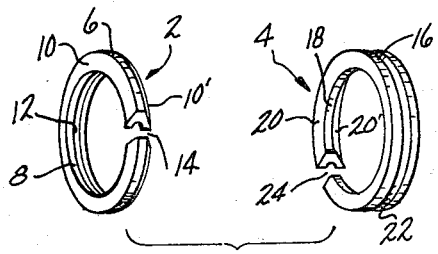
FIG. 1 is a perspective view of a pair of sealing rings utilized by the invention.

Referring now to FIG. 1, a pair of sealing rings 2 and 4 are shown. The rings 2 and 4 are made of a flexible metal, such as a spring steel, or the like so that they can be readily flexed in a radial direction when exposed to a pressurized fluid, and so that they will reassume their original configuration when the pressure of the gas is reduced, as will be set forth hereinafter in greater detail. The ring 2 includes an outer wall portion 6, an inner wall portion 8 and radially outwardly converging sidewall portions 10 and 10'. The oblique sidewalls 10 and 10' are shown as being planar, but it is understood that they could also be arcuate in cross section without departing from the scope of the invention. The inner wall portion 8 is preferably provided with a groove 12 to increase the flexibility of the ring 2 and to increase obturating characteristics. It is noted that the ring 2 is split so as to be interrupted by a generally transversely extending gap 14. The presence of the gap 14 permits the ring 2 to flex in a radially inward direction. The width of the gap 14 is greatly exaggerated in FIG. 1 for purposes of clarity.

The ring 4 includes outer wall portion 16, an inner wall portion 18 and a pair of radially inwardly converging oblique sidewall portions 20 and 20'. The outer wall portion 16 is provided with a groove 22 so as to increase the flexibility of the ring 4 and to increase obturating characteristics. It is noted that the ring 4 is also split to form a generally transverse interruption at 24. The width of the interruption at 24 is greatly exaggerated for purposes of clarity, and preferably should amount of merely a cut extending completely through the ring 4. The interruption 24 permits the ring 4 to flex in a radially outward direction.

Figure 2:
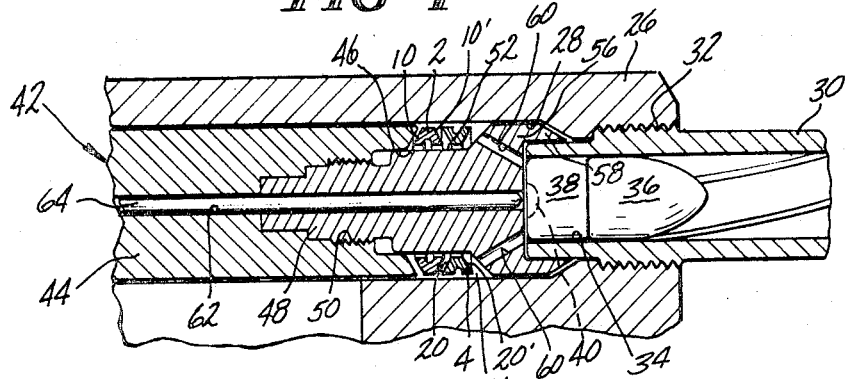
FIG. 2 is a fragmentary sectional side view of the receiver-firing chamber portion of a caseless firearm embodiment of this invention showing a caseless cartridge seated in the firing chamber.

Referring now to FIG. 2, the rings 2 and 4 are shown mounted in a caseless-type firearm. The firearm includes a housing or receiver 26 having a cylindrical bore 28. A barrel 30 is screwed into the forward end of the receiver 26 at 32 with the rear portion of the barrel 30 defining a firing chamber 34 which extends into the cylindrical bore 28. A caseless cartridge comprising a projectile 36 and a propellant pellet 38 is shown seated in the firing chamber 34. The propellant pellet 38 includes a primer portion 40. A bolt assembly 42 is shown in the receiver 26 in the battery position. The bolt assembly 42 includes a rearward cylindrical member 44 having a frontal inwardly and rearwardly tapering shoulder 46 thereon. The bolt assembly 42 further includes a cylindrical head portion 48 which is screwed into the member 44 at 50. The head portion 48 is undercut at 52 to form an annular space 54 between the head 48 and the wall of the cylindrical bore 28. The forward end of the head 48 includes an outwardly extending flange 56 having a frontal lip 58 which surrounds the rear end of the barrel 30. A plurality of passages 60 are disposed through a flange 56 to provide for fluid communication between the firing chamber 34 and the annular space 54. An axial passage 62 is formed in the bolt assembly 42 to slidably house a firing pin 64. The firing pin 64 is actuated by a conventional trigger and hammer assembly which are not shown, and which form no part of this invention. It is noted that the bolt assembly 42 is freely slidable for reciprocation within the receiver 26. The sealing rings 2 and respectively are disposed about head 48 in the annular space 54. It is noted that the rings 2 and 4, as shown in FIG. 2, are in their normal or unflexed configuration, and are freely mounted in the annular space 54 so as not to interfere with the sliding movement of the bolt assembly 42. One sidewall portion 10 on the ring 2 is disposed adjacent the tapered shoulder 46, and one sidewall portion 20' on the ring 4 is disposed adjacent the passages 60. The remaining sidewall portions 10' and 20 on the rings 2 and 4 respectively are disposed in contiguous, face-to-face relationship.

Figure 3:
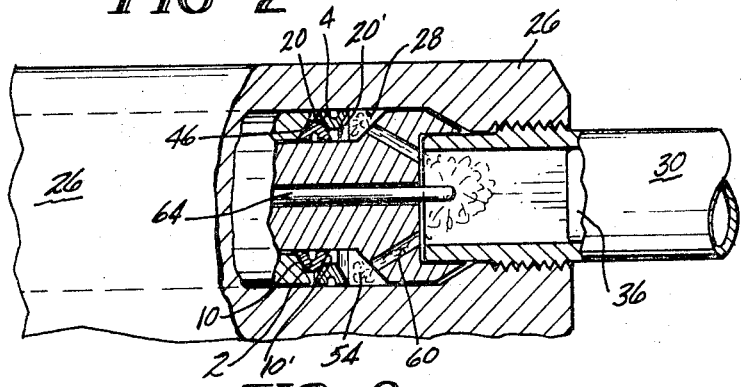
FIG. 3 is a fragmentary sectional side view similar to FIG. 2 showing the sealing action of the sealing rings after the caseless round is fired.

FIG. 3 shows the gun after the firing pin 64 has been moved forward to strike the primer on the caseless cartridge and fire the latter to produce high-pressure combustion gases. The projectile 36 has been moved a short distance through the barrel as shown in FIG. 3. The high-pressure combustion gases pass through the passages 60 into the annular space 54 to act upon the sidewall 20' on the ring 4. The pressure of the gases acting against the sloping sidewall 20' causes the ring 4 to flex radially outwardly into sealing engagement with the wall of the cylindrical bore 28 while at the same time moving the ring 4 rearwardly against the ring 2. The sidewall 20 on the ring 4 is thus moved against the sidewall 10' on the ring 2. The ring 2 is thus trapped between the sloping surfaces 20 and 46 and flexed radially inwardly into sealing engagement with the undercut portion 52 on the cylindrical bolt assembly head 48. It is noted that the cut 24 on the ring 4 opens slightly as the ring 4 is flexed into its sealing configuration, but at the same time the gap 14 on the ring 2 closes as the ring 2 is flexed into its sealing configuration thus minimizing the escape of gas through the cut 24. When the projectile 36 leaves the barrel 30, the high-pressure gases are free to escape through the barrel bore and the rings 2 and 4 are then free to flex back to their normal configuration shown in FIG. 2.

Figure 4:
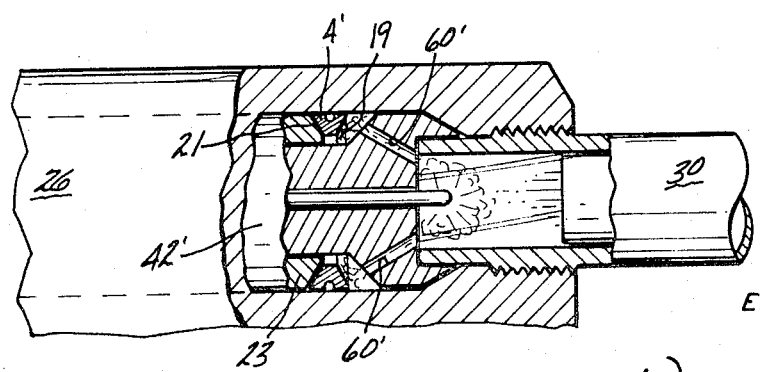
FIG. 4 is a fragmentary sectional side view similar to FIG. 3, but showing a modified form of this invention utilizing only one sealing ring.

Referring now to FIG. 4, a modification of this invention is shown wherein only a single sealing ring is utilized. The ring 4' is similar to the ring 4 shown in FIG. 1. The ring 4' includes a pair of converging sidewalls 19 and 21, with the sidewall 21 being disposed adjacent to an oblique shoulder 23 formed on the bolt assembly 42'. When the caseless cartridge is ignited, the high-pressure gases thus produced pass through the passages 60' to impinge upon the sidewall 19 on the ring 4'. These high-pressure gases acting upon the sidewall 19 force the other sidewall 21 against the oblique shoulder 23 and combine therewith to cause the ring 4' to expand radially outwardly against the receiver wall 28' to obturate the breech.

It is thus readily apparent that the sealing rings of this invention are only effective to seal gas leakage when acted upon by high-pressure gases, and the rings do not impede the reciprocation of any sliding elements in the system when the internal gas pressure in the system is reduced. Further, the rings are inexpensive to manufacture, and being metallic, are not subject to the excessive wear that a rubber or soft plastic ring would experience in a similar environment. It is further obvious that the overall sealing effect produced by the rings can be varied by varying the number of rings utilized, and by controlling the amount of flexure required to effect a seal.

While a preferred embodiment of this invention has been disclosed in the form of a firearm for caseless cartridges, it is understood that the invention is not limited thereto and may be used in other systems.

Although reference has been made to a particular embodiment of the present invention various modifications will readily suggest themselves to those skilled in the art, and reference should be made to appended claims to determine the scope of the invention.

I claim:

1. A fluid seal comprising:
  a. a housing having a cylindrical bore including a cylindrical bore wall;
  b. a generally cylindrical body disposed in said bore, said cylindrical body having an outer wall portion offset from said cylindrical bore wall to provide an annular space therebetween;
  c. a source of high-pressure fluid;
  d. a first ring member disposed in said annular space, said first ring member including an outer wall portion adjacent said cylindrical bore wall, an inner wall portion adjacent said cylindrical body outer wall, and radially outwardly converging sidewall portions, said first ring member being interrupted by a gap permitting radial flexure of said first ring member;
  e. second ring member disposed in said annular space, said second ring member including an outer wall portion adjacent said cylindrical bore wall, an inner wall portion adjacent said cylindrical body outer wall, and radially inwardly converging sidewalls, said second ring member being interrupted by a gap permitting radial flexure of said second ring member;
  f. means in said annular space operative to limit the extent of longitudinal movement of said first and second ring members; and
  g. means forming at least one fluid passage extending between said high-pressure fluid source and said annular space to provide for the flow of high-pressure fluid from said source to said annular space to act upon said ring members to radially flex the latter into fluid sealing engagement with said cylindrical bore wall and said cylindrical body outer wall.

2. A fluid seal comprising:
  a. a housing having a cylindrical bore wall;
  b. a generally cylindrical body disposed in said bore, said cylindrical body and said cylindrical bore wall combining to provide an annular space of limited longitudinal dimensions;
  c. a first ring member disposed in said annular space, said first ring member having at least one oblique sidewall portion, and said first ring member being interrupted by a cut permitting radial flexure of said first ring member;
  d. means adjacent one end of said cylindrical body providing a chamber for the development of high-pressure gases; and
  e. at least one passage extending through said cylindrical body from said chamber to said annular space to permit high-pressure fluid to flow from said chamber to said annular space to act upon said ring member to flex the latter radially into gas sealing engagement with one of said cylindrical bore wall and said cylindrical body.

UNITED STATES PATENT OFFICE
CERTIFICATE OF CORRECTION

Patent No. 3,572,729            Dated    March 30, 1971

Inventor(s) Elmer Raleigh Hodil, Jr.

It is certified that error appears in the above-identified patent and that said Letters Patent are hereby corrected as shown below:

In Column 3, line 10, the word "respectively" should be --4

Signed and sealed this 24th day of August 1971.

(SEAL)
Attest:

EDWARD M. FLETCHER, JR.          WILLIAM E. SCHUYLER, JR.
Attesting Officer                Commissioner of Patents

FORM PO-1050 (10-69)